(12) United States Patent
Haib et al.

(10) Patent No.: US 9,336,140 B1
(45) Date of Patent: May 10, 2016

(54) EFFICIENT MANAGEMENT OF HIERARCHICALLY-LINKED DATA STORAGE SPACES

(71) Applicant: International Business Machines Corporation, Armonk, NY (US)

(72) Inventors: Ashraf Haib, Rama (IL); Ateret Anaby-Tavor, Givat Ada (IL); Moran Gavish, Kibbutz Ein Carmel (IL); Lior Limonad, Nesher (IL); Sergey Zeltyn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/583,711

(22) Filed: Dec. 28, 2014

(51) Int. Cl.
*G06F 12/02* (2006.01)
*G06F 12/08* (2016.01)
*G06F 17/30* (2006.01)

(52) U.S. Cl.
CPC .......... *G06F 12/08* (2013.01); *G06F 17/30327* (2013.01); *G06F 17/30961* (2013.01); *G06F 2212/1012* (2013.01)

(58) Field of Classification Search
CPC ............ G06F 12/08; G06F 2212/1012; G06F 17/30961; G06F 17/30327
See application file for complete search history.

(56) References Cited

U.S. PATENT DOCUMENTS

| 5,659,743 | A  * | 8/1997 | Adams ................... G06F 3/0601 711/170 |
| 6,449,627 | B1 * | 9/2002 | Baer ....................... G06F 17/21 707/E17.116 |
| 6,611,840 | B1 * | 8/2003 | Baer .................... G06F 17/3089 707/812 |
| 7,007,034 | B1 * | 2/2006 | Hartman, Jr. ...... G06F 17/30038 707/812 |
| 7,406,432 | B1  | 7/2008 | Motoyama |
| 7,930,559 | B1 * | 4/2011 | Beaverson .......... G06F 11/1453 711/111 |
| 2003/0004763 | A1 | 1/2003 | LaBlanc et al. |
| 2004/0039627 | A1 | 2/2004 | Palms et al. |
| 2013/0030858 | A1 | 1/2013 | Gupta et al. |

OTHER PUBLICATIONS

Disclosed Anonymously., "Predecessor Mapping and Analysis in Project Plans", An IP.com Prior Art Database Technical Disclosure, Apr. 27, 2012.

* cited by examiner

*Primary Examiner* — Hiep Nguyen

(57) ABSTRACT

Data storage management by determining, for leaf and summary storage spaces of a data storage space hierarchy having at least two leaf storage spaces descending from at least one summary storage space, an invariant leaf attribute value for each leaf attribute type, an invariant summary attribute value for each descending leaf attribute type as a sum of the invariant leaf attribute values of all leaves descending from the summary storage space, and for each leaf, a variable leaf attribute value for each leaf attribute type, and, for each summary storage space, a variable summary attribute value for each descending leaf attribute type, where for each summary storage space, and for each storage space immediately descending from the summary storage space, each variable leaf attribute value of the immediately descending storage space is expressed as a proportion of the variable summary attribute value for the same attribute type.

20 Claims, 4 Drawing Sheets

EFFICIENT MANAGEMENT OF HIERARCHICALLY-LINKED DATA STORAGE SPACES

BACKGROUND

As the world's data storage requirements continue to grow, efficient management of data storage is critical. As there are many different types of data storage paradigms and techniques, data management techniques for one data storage paradigm may not be suited to other data storage paradigms.

SUMMARY

Embodiments are provided for efficient management of hierarchically-linked data storage spaces using historical data from similarly-arranged hierarchically-linked data storage spaces and/or using expert knowledge to facilitate top-down and bottom-up propagation of data space attribute values.

In one aspect of the invention a method is provided for data storage management, the method including, for each leaf storage space of a data storage space hierarchy having at least two leaf storage spaces descending from at least one summary storage space, where each leaf storage space has at least one attribute type, determining an invariant leaf storage space attribute value for each attribute type of the leaf storage space, for each summary storage space, determining an invariant summary storage space attribute value for each attribute type of each leaf storage space descending from the summary storage space as a sum of the invariant leaf storage space attribute values of all leaf storage spaces descending from the summary storage space, for each leaf storage space, determining a variable leaf storage space attribute value for each attribute type of the leaf storage space, and, for each summary storage space, determining a variable summary storage space attribute value for each attribute type of each leaf storage space descending from the summary storage space, where for each summary storage space, and for each storage space immediately descending from the summary storage space, each variable leaf storage space attribute value of the immediately descending storage space is expressed as a proportion of the variable summary storage space attribute value of the summary storage space for the same attribute type.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
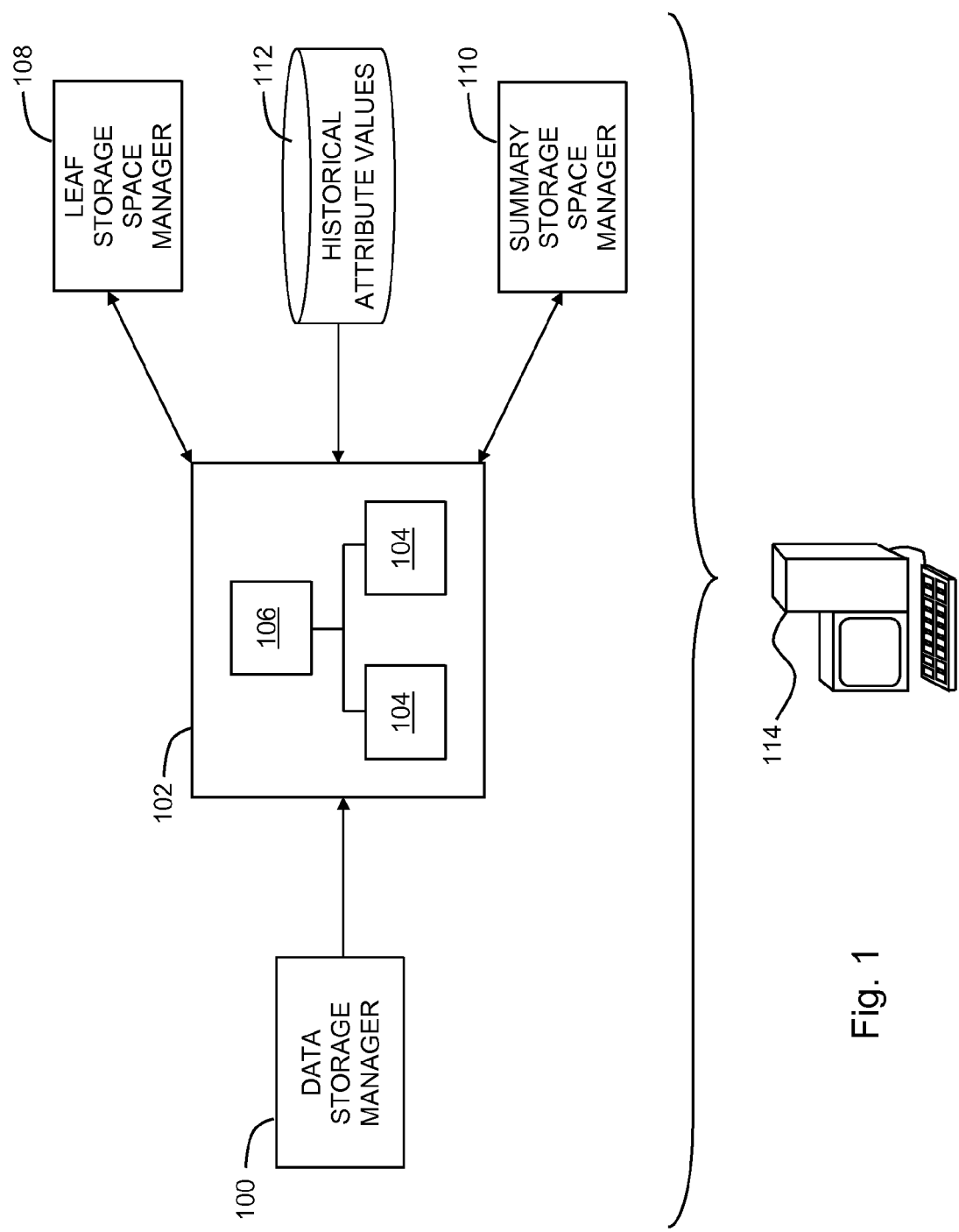
FIG. 1 is a simplified conceptual illustration of a data storage management system, constructed and operative in accordance with an embodiment of the invention.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A data storage space, as used herein, may include any physical or logical representation of data that may be stored on a computer readable storage medium, such as a hard disk block or sector, a cell of a computer-based spreadsheet, a field of a computer-based database, or a data structure representing a task in a computer-based project plan.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the values/acts specified in the flowchart and/or block diagram block or blocks. These computer readable program instructions may also be stored in a computer readable storage medium that can direct a computer, a programmable data processing apparatus, and/or other devices to value in a particular manner, such that the computer readable storage medium having instructions stored therein comprises an article of manufacture including instructions which implement aspects of the value/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the values/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical value(s). In some alternative implementations, the values noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified values or acts or carry out combinations of special purpose hardware and computer instructions.

Reference is now made to FIG. 1 which is a simplified conceptual illustration of a data storage management system, constructed and operative in accordance with an embodiment of the invention. In the system of FIG. 1, a data storage manager 100 is configured in accordance with conventional techniques to enable hierarchically-linked data storage spaces 102 to be configured, such as in computer memory or any other known type of data storage medium, where hierarchically-linked data storage spaces 102 include multiple leaf storage spaces 104, where the leaf storage spaces 104 physically or logically "descend" from one or more summary storage spaces 106, and where each summary storage space 106 is a grouping of one or more leaf storage spaces 104 and/or one or more other summary storage spaces 106. Data storage manager 100 is also configured in accordance with conventional techniques to allow one or more types of attributes to be defined in each leaf storage space 104, where some examples of attribute types include data access priority and maximum data storage, although an attribute may represent any type of information relating to a data storage space or to the data represented in or by the data storage space.

A leaf storage space manager 108, which may be incorporated within data storage manager 100 or may be separate therefrom, is configured to determine, for any, and preferably every, leaf storage space 104, both an invariant leaf storage space attribute value for each attribute type of the leaf storage space 104, and a variable leaf storage space attribute value for each attribute type of the leaf storage space 104. Similarly, a summary storage space manager 110, which may be incorporated within data storage manager 100 or may be separate therefrom, is configured to determine, for any, and preferably every, summary storage space 106 an invariant summary storage space attribute value for each attribute type of each leaf storage space 104 descending from the summary storage space 106 as a sum of the invariant leaf storage space attribute values of all leaf storage spaces 104 descending from the summary storage space, as well as a variable summary storage space attribute value for each attribute type of each leaf storage space 104 descending from the summary storage space 106. Preferably, for each summary storage space, and for each summary or leaf storage space immediately descending from the summary storage space, each variable storage space attribute value of the immediately descending storage space is expressed as a proportion of the variable summary storage space attribute value for the same attribute type of the summary storage space from which the storage space descends.

Leaf storage space manager 108 and summary storage space manager 110 may be used to manually determine the attribute values described above. Additionally or alternatively, leaf storage space manager 108 and summary storage space manager 110 are preferably configured to cooperate to determine the attribute values in accordance with a predefined optimization mechanism that is applied to historical attribute values 112 of the attribute types of the leaf storage spaces, such as may be known from data storage systems that employed identical or similar summary and leaf storage spaces. An example of one such optimization mechanism is described hereinbelow with reference to FIG. 2.

Any of the elements shown in FIG. 1 are preferably implemented by one or more computers, such as by a computer 114, in computer hardware and/or in computer software embodied in a non-transitory, computer-readable storage medium in accordance with conventional techniques.

Figure 2:
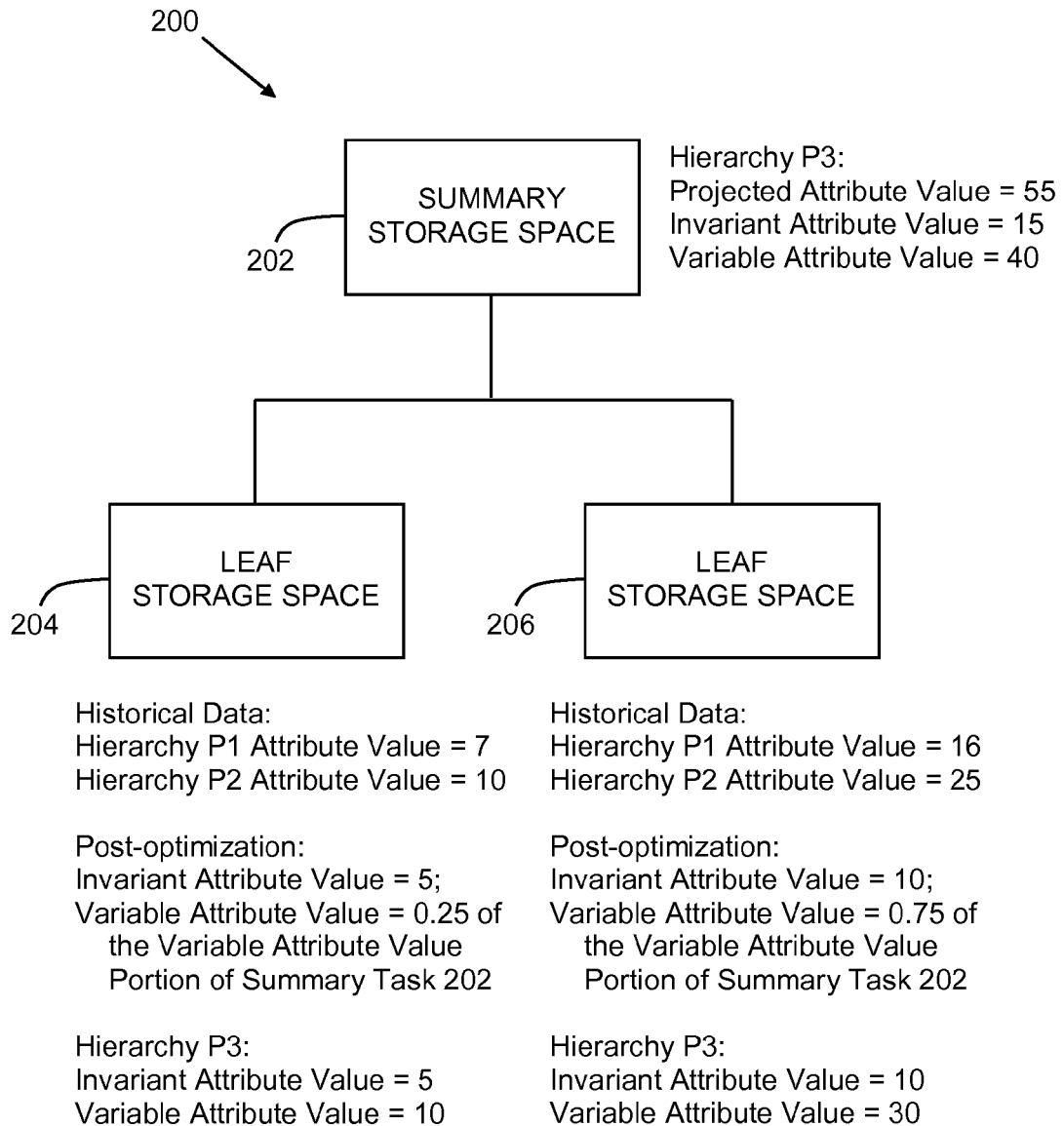
FIG. 2 is a simplified conceptual illustration of hierarchically-linked data storage spaces configured using an optimization value in accordance with an embodiment of the invention.

Reference is now made to FIG. 2, which is a simplified conceptual illustration of a hierarchically-linked data storage spaces configured using an optimization mechanism in accordance with an embodiment of the invention. In FIG. 2 a group of hierarchically-linked data storage spaces 200 is shown having a single summary storage space 202 from which immediately descends two leaf storage spaces 204 and 206, although the any number of summary storage spaces and leaf storage spaces may be defined, with any number of intermediate summary storage spaces separating other summary storage spaces and leaf storage spaces. Each storage space may also have any number of attribute types as described hereinabove, although, for illustration purposes only, all storage spaces described hereinbelow are described with respect to a single attribute type. Thus, a storage space's attribute value is denoted herein as C=A+B, where:

A is the invariant portion of the total storage space's attribute value C, which may, for example, relate to a minimum data access priority or minimum data storage requirement, and B is the variable portion of the total storage space's attribute value C.

If a parent storage space is composed of N sub-storage spaces, then for each sub-storage space i (1≤i≤N), the attribute value is similarly denoted as $c_i=a_i+\beta_i \cdot B$, given $\Sigma\beta_i=1$, where:

$a_i$ is the invariant portion of the sub-storage space such that $A=\Sigma a_i$, B is the variable portion of attribute value of the parent storage space, and $\beta_i$ is the proportion of the parent storage space's variable attribute value.

The attribute value of a summary storage space is modeled to equal the aggregation of the attribute value of its sub-storage spaces. Thus, rolling up sub-storage space attribute value into summary storage space attribute value may be expressed as:

$$\Sigma c_i = \Sigma(a_i+\beta_i \cdot B) = \Sigma a_i + \Sigma(\beta_i \cdot B) = A + B \cdot \Sigma \beta_i = A+B$$

Where historical information is available for a set of M data storage hierarchies (M>=2) having similar storage spaces and known attribute values, any similar system of hierarchically-linked data storage spaces may be similarly configured, where $a_i$ and $\beta_i$ are determined for each storage space by solving the following optimization problem. For any summary storage space, its computed attribute value in any system j of hierarchically-linked data storage spaces is the sum of it sub-storage spaces, which may be expressed as $C_j=\Sigma_{i=1}^{N} c_{ij}$. The attribute value of substorage space i in system j may be expressed as $c_{ij}=a_i+\beta_i B_j+\epsilon_{ij}$, where $\epsilon_{ij}$ is a measurement error component, or alternatively as $c_{ij}=(a_i+\beta_i B_j) \cdot (1+\epsilon_{ij})$, where the error is proportional to the overall storage space attribute value. An estimate for $B_j$ (1≤j≤M) may be defined as $\hat{B}=C_j-\min_{1 \leq k \leq M} C_k$, where $\min_{1 \leq k \leq M} C_k$ is the minimally observed attribute value for the storage space across all similar data storage hierarchies. For any storage space in the system, its variable attribute value portion is derived from the scaling attributes of that storage space in the system. Where the scaling attributes are sufficiently small, the variable attribute value may be ignored, and therefore the entire residual attribute value may be attributed to the storage space's invariant attribute value. Thus, $C_j=A=\alpha$, would be the minimal possible attribute value for storage space amongst the overall set of historical attribute values. The optimization problem may be expressed using the following value:

$$\sum_{i=1}^{N} \sum_{j=1}^{M} (c_{ij} - a_i - \beta_i \tilde{B}_j)^2 \to \min$$

$$\text{s.t. } a_i \geq 0, \beta_i \geq 0, \sum \beta_i = 1$$

Thus, where historical attribute values are known for two similar data storage hierarchies P1 and P2, where the attribute values were as follows:

P1: leaf storage space 204=7, leaf storage space 206=16

P2: leaf storage space 204=10, leaf storage space 206=25 hierarchically-linked data storage spaces 200 are configured with the same storage space hierarchy whose attribute values are determined by applying the above optimization as follows:

leaf storage space 204: invariant attribute value=5; variable attribute value=0.25 of the variable attribute value portion of summary storage space 202 leaf storage space 206: invariant attribute value=10; variable attribute value=0.75 of the variable attribute value portion of summary storage space 202.

Applying hierarchically-linked data storage spaces 202, as configured above, to a similar data storage hierarchy P3 whose total projected attribute value is 55, the projected attribute value may be propagated to the various storage spaces as follows:

summary storage space 202: total attribute value=55; invariant attribute value=15; variable attribute value=40 leaf storage space 204: total attribute value=15; invariant attribute value=5; variable attribute value=10 leaf storage space 206: total attribute value=40; invariant attribute value=10; variable attribute value=30.

Figure 3:
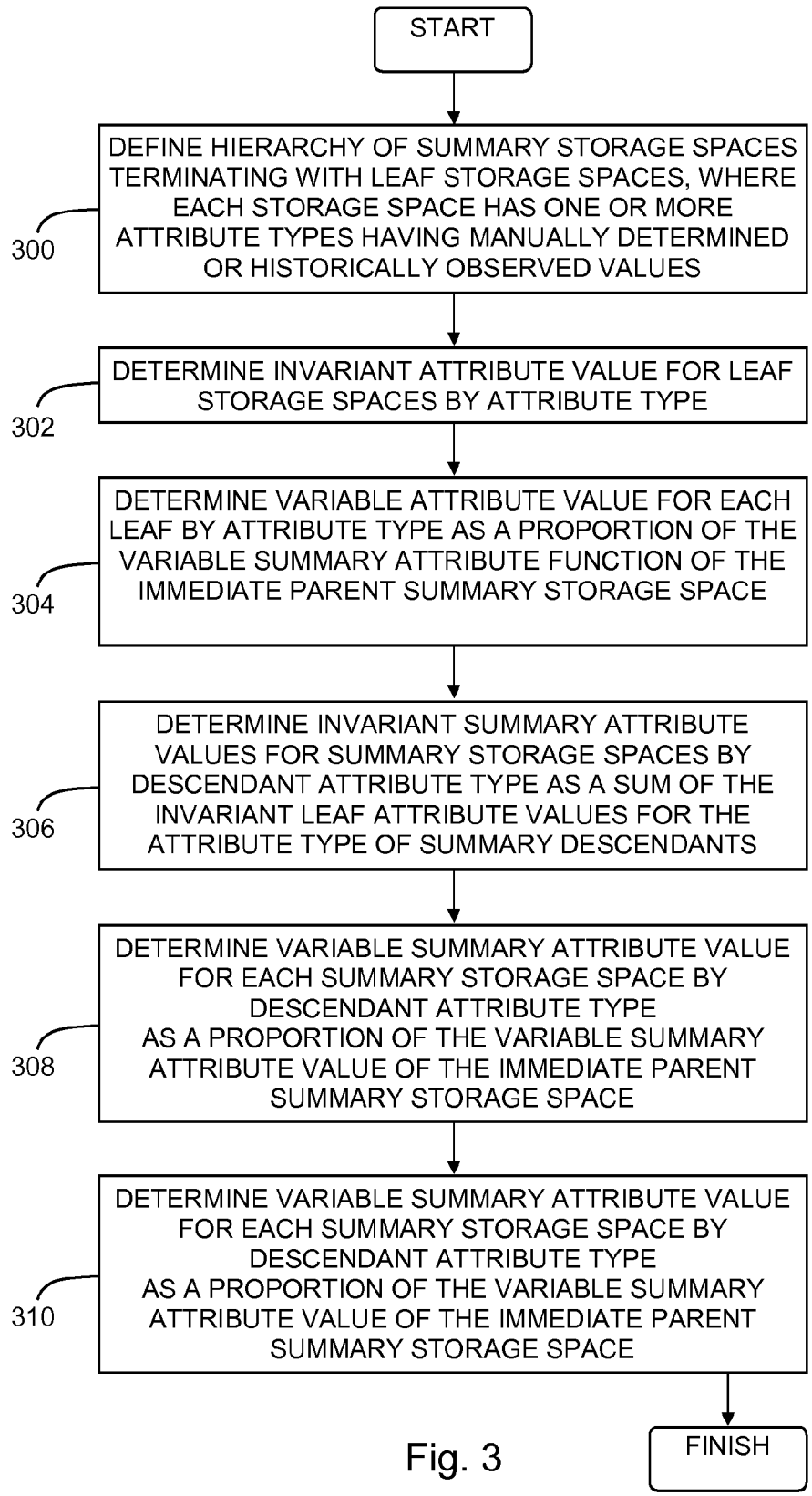
FIG. 3 is a simplified flowchart illustration of an exemplary method of operation of the system of FIG. 1, operative in accordance with an embodiment of the invention.

Reference is now made to FIG. 3 which is a simplified flowchart illustration of an exemplary method of operation of the system of FIG. 1, operative in accordance with an embodiment of the invention. In the method of FIG. 3, hierarchically-linked data storage spaces are defined including multiple leaf storage spaces descending from one or more summary storage spaces, with any number of intermediate summary storage spaces, where each storage space has one or more attribute types having manually determined or historically observed values (step 300). For any, and preferably every, leaf storage space and attribute type associated with the leaf storage space, an invariant leaf storage space attribute value (step 302) and a variable leaf storage space attribute value (step 304) are determined, where the variable leaf storage space attribute value for a given leaf storage space is expressed as a proportion of the variable summary storage space attribute value of its immediate parent summary storage space. For any, and preferably every, summary storage space and attribute type of any, and preferably every, leaf storage space descending from the summary storage space, an invariant summary storage space attribute value is determined as a sum of the invariant leaf storage space attribute values for the attribute type of all leaf storage spaces descending from the summary storage space (step 306), and a variable summary storage space attribute value is determined for the attribute type of each leaf storage space descending from the summary storage space, where the variable summary storage space attribute value for a given summary storage space is expressed as a proportion of the variable summary storage space attribute value of its immediate parent summary storage space (step 308).

Figure 4:
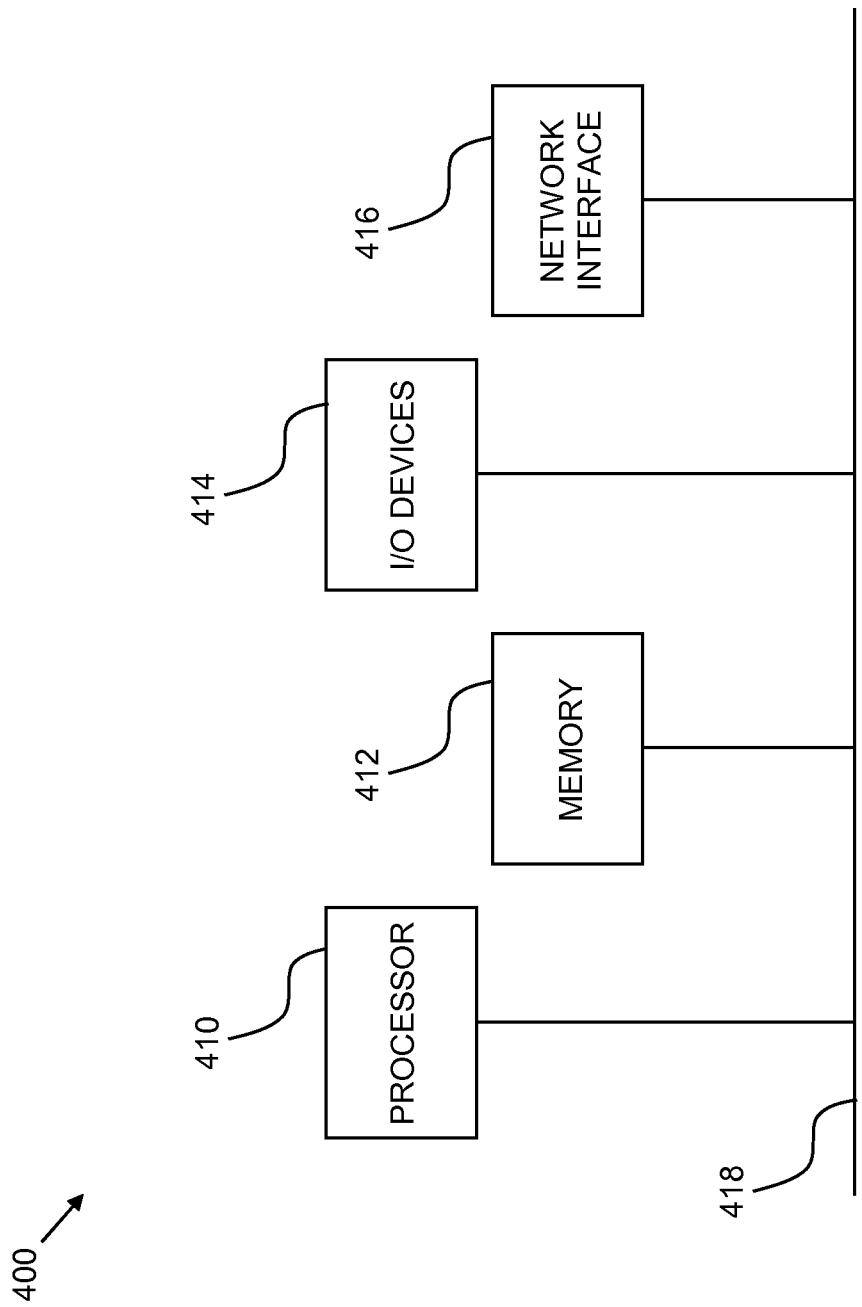
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-3) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. For example, the invention may be implemented as a project template configuration system, where the hierarchically-linked data storage spaces represent a project template, such as may be used for building projects or software development projects, where the summary storage spaces represent summary tasks, and where the leaf storage spaces represent leaf tasks, such as building a wall of a house or writing a module of a computer software application. The attribute types described herein may relate to types of attributes defined for each leaf task, where some examples of attribute types include duration, effort, cost and resources required for the task to be completed, and where their fill amounts relate to their attribute values. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data storage management, the method comprising:

for each leaf storage space of a data storage space hierarchy having at least two leaf storage spaces descending from at least one summary storage space, wherein each leaf storage space has at least one attribute type, determining an invariant leaf storage space attribute value for each attribute type of the leaf storage space;

for each summary storage space, determining an invariant summary storage space attribute value for each attribute type of each leaf storage space descending from the summary storage space as a sum of the invariant leaf storage space attribute values of all leaf storage spaces descending from the summary storage space;

for each leaf storage space, determining a variable leaf storage space attribute value for each attribute type of the leaf storage space; and for each summary storage space, determining a variable summary storage space attribute value for each attribute type of each leaf storage space descending from the summary storage space, wherein for each summary storage space, and for each storage space immediately descending from the summary storage space, each variable leaf storage space attribute value of the immediately descending storage space is expressed as a proportion of the variable summary storage space attribute value of the summary storage space for the same attribute type.

2. The method of claim 1 wherein the determining steps are performed wherein the data storage space hierarchy is embodied in a magnetic or optical data storage device.

3. The method of claim 1 and further comprising defining the data storage space hierarchy to include the at least two leaf storage spaces descending from the at least one summary storage space.

4. The method of claim 3 and further comprising defining the data storage space hierarchy wherein the at least one summary storage space includes a plurality of summary storage spaces, and wherein at least one of the summary storage spaces descends from another one of the summary storage spaces.

5. The method of claim 1 wherein the determining comprises determining by applying a predefined optimization value to historical values of the attribute types of the leaf storage spaces.

6. The method of claim 5 wherein the applying comprises determining the values such that the values are minimally deviant from the historical values.

7. The method of claim 1 wherein the determining is implemented in any of
a) computer hardware, and
b) computer software embodied in a non-transitory, computer-readable medium.

8. A data storage management system comprising:

a leaf storage space manager configured to determine, for each leaf storage space of a data storage space hierarchy having at least two leaf storage spaces descending from at least one summary storage space, wherein each leaf storage space has at least one attribute type,
an invariant leaf storage space attribute value for each attribute type of the leaf storage space, and
a variable leaf storage space attribute value for each attribute type of the leaf storage space; and a summary storage space manager configured to determine, for each summary storage space,
an invariant summary storage space attribute value for each attribute type of each leaf storage space descending from the summary storage space as a sum of the invariant leaf storage space attribute values of all leaf storage spaces descending from the summary storage space, and
a variable summary storage space attribute value for each attribute type of each leaf storage space descending from the summary storage space, wherein for each summary storage space, and for each storage space immediately descending from the summary storage space, each variable leaf storage space attribute value of the immediately descending storage space is expressed as a proportion of the variable summary storage space attribute value of the summary storage space for the same attribute type.

9. The system of claim 8 wherein the data storage space hierarchy is embodied in a magnetic or optical data storage device.

10. The system of claim 8 and further comprising a data storage manager configured to define the data storage space hierarchy to include the at least two leaf storage spaces descending from the at least one summary storage space.

11. The system of claim 10 wherein the at least one summary storage space includes a plurality of summary storage spaces, and wherein at least one of the summary storage spaces descends from another one of the summary storage spaces.

12. The system of claim 8 wherein the leaf storage space manager and the summary storage space manager cooperate to determine the attribute values in accordance with a predefined optimization value applied to historical values of the attribute types of the leaf storage spaces.

13. The system of claim 12 wherein the predefined optimization value is configured to determine the values such that the values are minimally deviant from the historical values.

14. The system of claim 8 wherein the leaf storage space manager and the summary storage space manager are implemented in any of
   a) computer hardware, and
   b) computer software embodied in a non-transitory, computer-readable medium.

15. A computer program product for data storage management, the computer program product comprising:
   a non-transitory, computer-readable storage medium; and
   computer-readable program code embodied in the storage medium, wherein the computer-readable program code is configured to
      determine, for each leaf storage space of a data storage space hierarchy having at least two leaf storage spaces descending from at least one summary storage space, wherein each leaf storage space has at least one attribute type, an invariant leaf storage space attribute value for each attribute type of the leaf storage space;
      determine, for each summary storage space, an invariant summary storage space attribute value for each attribute type of each leaf storage space descending from the summary storage space as a sum of the invariant leaf storage space attribute values of all leaf storage spaces descending from the summary storage space;
      determine, for each leaf storage space, a variable leaf storage space attribute value for each attribute type of the leaf storage space; and
      determine, for each summary storage space, a variable summary storage space attribute value for each attribute type of each leaf storage space descending from the summary storage space,
   wherein for each summary storage space, and for each storage space immediately descending from the summary storage space, each variable leaf storage space attribute value of the immediately descending storage space is expressed as a proportion of the variable summary storage space attribute value of the summary storage space for the same attribute type.

16. The computer program product of claim 15 wherein the wherein the data storage space hierarchy is embodied in a magnetic or optical data storage device.

17. The computer program product of claim 15 wherein the computer-readable program code is configured to define the data storage space hierarchy to include the at least two leaf storage spaces descending from the at least one summary storage space.

18. The computer program product of claim 17 wherein the computer-readable program code is configured to define the data storage space hierarchy wherein the at least one summary storage space includes a plurality of summary storage spaces, and wherein at least one of the summary storage spaces descends from another one of the summary storage spaces.

19. The computer program product of claim 15 wherein the computer-readable program code is configured to determine the values by applying a predefined optimization value to historical values of the attribute types of the leaf storage spaces.

20. The computer program product of claim 19 wherein the computer-readable program code is configured to determine the values such that the values are minimally deviant from the historical values.

* * * * *